3,640,893
ANTI-FOAM OIL
Alan David Forbes, Woking, and Neville John Hunter, Walton-on-Thames, England, assignors to The British Petroleum Company Limited, London, England
Filed Oct. 28, 1969, Ser. No. 871,886
Claims priority, application Great Britain, Nov. 12, 1968, 53,568/68
Int. Cl. B01d 17/00
U.S. Cl. 252—321        5 Claims

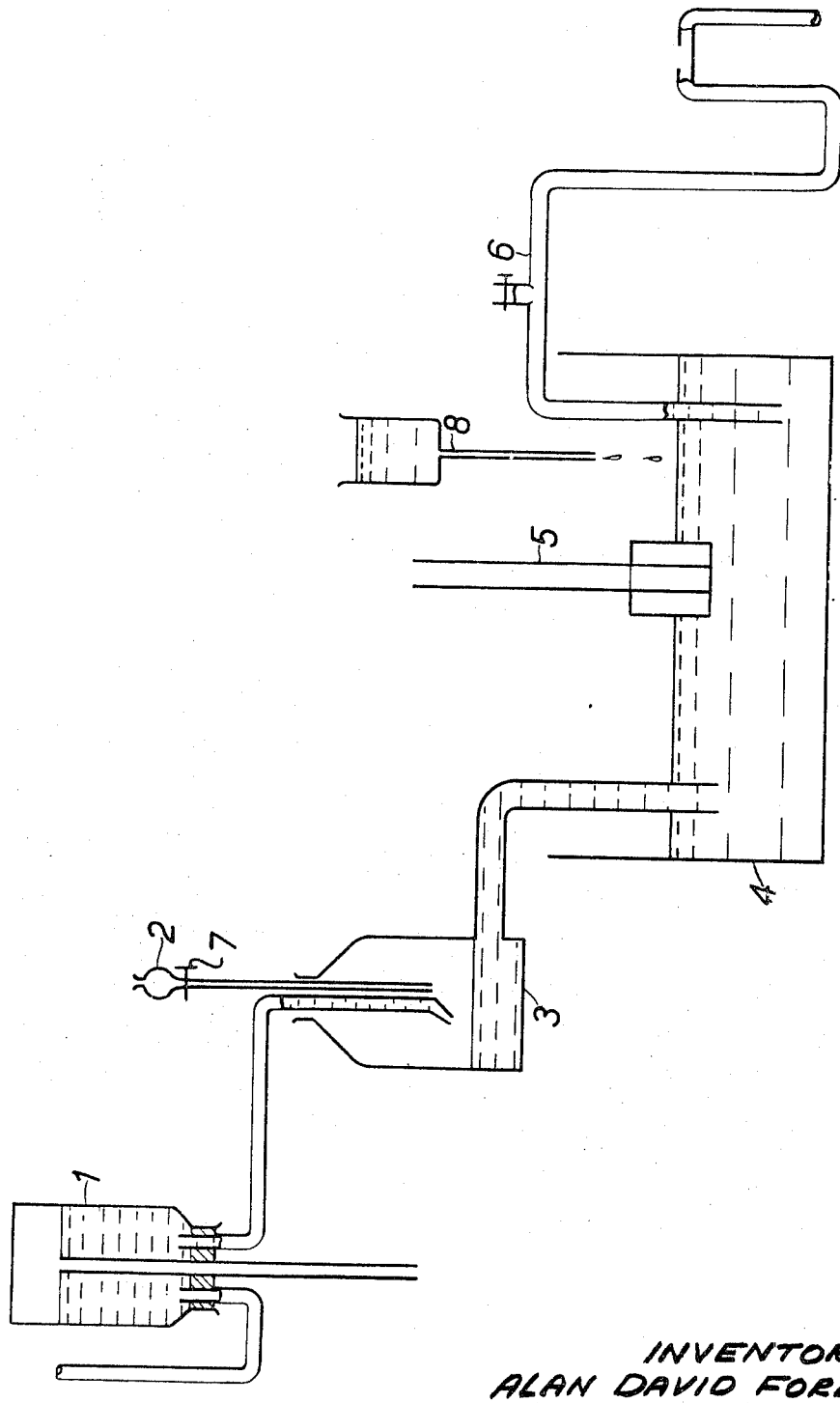

ABSTRACT OF THE DISCLOSURE

Disclosed is a composition for use in combating foam formation in aqueous systems comprised of a mineral base oil and 0.1 to 25% by weight of a fatty acid product resulting from the hydrolysis of a lipid extract obtained by solvent extraction of micro-organism culture grown on a hydrocarbon substrate.

---

This invention relates to compositions useful in suppressing or inhibiting the formation of foams, and breaking of foams.

The compositions are especially useful in suppressing the formation of foams in sewage treatment. Sewage treatment involves the use of mechanical methods to remove large particles from the water and then the action of bacteria to destroy the smaller particles of organic matter. On entering the sewage treatment plant the sewage is passed through a coarse screen to remove large solids, and is then passed through channels designed to reduce its velocity so that grit and sand can settle out. The sewage then passes into large settling tanks and the sludge which collects in these tanks is run off into lagoons or digesters.

The effluent from the settling tanks still contains dissolved solids and colloidal particles of organic matter, and can be treated by the "activated sludge" process. In this process the liquid is aerated either mechanically or by blowing diffused air through it. The aeration produced is very vigorous and can give rise to quite serious foaming problems.

Although foam-formation is most serious in the activated sludge process it also occurs in other sewage treatment stages and can also occur on large expanses of water, rivers etc. As well as obscuring controls and making gangways slippery foam decreases the efficiency of sewage treatment. Airborne foam can carry bacteria and can cause a health hazard, and when foam covers plants or grass it leaves a deposit which can kill them.

For these reasons it is desirable to reduce the formation of foam as much as possible, and various compositions have been devised to inhibit the formation of foams.

Compositions have been devised which comprise a liquid carrier, usually a mineral base oil, e.g. a spindle oil of viscosity of 10–30 centistokes at 140° F., and an anti-foam additive.

We have found that compounds derived from the lipid extracts obtained from the growth of micro-organisms on a hydrocarbon substrate when added to a mineral base oil from anti-foam compositions.

It is known that it is possible to grow micro-organisms from hydrocarbons by cultivation of micro-organism cultures on a hydrocarbon substrate in the presence of nutrient media and oxygen. The recovered organisms may be purified by solvent extraction and the purified micro-organisms are available as a food-stuff. The waste products from the purification stage are a complex mixture of chemicals and are known as lipid extracts. The lipid extracts comprise approximately 10% of the dried culture. Preferably the micro-organisms are yeasts.

According to the invention there is provided a composition for inhibiting the formation of foams which comprises a mineral base oil and a hydrolysed lipid extract as hereinafter defined.

The invention also provides a method of inhibiting the formation of foams on liquid surfaces comprising adding to the liquid surface the above composition.

The invention can also be used for breaking foams that have already formed.

By lipid extract is meant that portion of the micro-organism culture grown on a hydrocarbon substrate which is separated from the micro-organism by solvent extraction.

The hydrolysis of the lipid extract may take place using acidic or basic hydrolysis. When the lipid extract is subjected to acidic hydrolysis the acid used is preferably a mineral acid for example, hydrochloric or sulphuric, and when basic hydrolysis is used the base is preferably an alkali metal hydroxide, for example sodium or potassium hydroxide.

Preferably the composition contains from 0.1 to 25% by weight of the lipid extract, more preferably 1 to 15% by weight.

In order to separate the lipid extract from the micro-organisms, a solvent system consisting of a polar and non-polar solvent may be used. Preferably the polar solvent contains a hydroxyl group. Suitable solvent systems are ethanol/diethyl-ether, methanol/chloroform, and isopropanol/n-hexane, especially useful solvent systems are azeotropic mixtures of alcohols and hydrocarbons. Solvent systems consisting of alcohol/water mixtures are also useful, and the preferred solvent system is an azeotropic isopropanol/water system. The extraction may be carried out at room temperature.

Diethyl-ether may be used as a sole extractant but careful temperature control is required for efficient separation.

After the initial extraction of the lipid extract the solvents used can be evaporated off. When water is present in the solvent system an equeous mixture is left which is then distilled to remove the water.

The hydrocarbons in which the yeast culture is grown are preferably petroleum fractions which can be obtained directly from crude oil. Preferably $C_{10}$ or higher straight chain hydrocarbons are present in, or constitute the hydrocarbon in which the micro-organism are grown, and preferably the hydrocarbon contains from 10–15% of straight chain paraffins. Suitable methods for growing yeast cultures are described in U.K. Pats. 914,567, 914,568, 1,017,584, 1,017,585, 1,021,697, 1,021,698, 1,049,065, 1,049,067, 1,059,881, 1,049,066, 1,059,886, 1,059,887, 1,059,891, 1,089,093, 1,095,182, 1,095,183, and in pending U.K. patent applications 27,284/65, 44,385/65, 4,763/66, 5,640/66, 2,580/67, 2,582/67, 33,087/67, 33,088/67 and 47,516/66.

The yeasts in this specification are classified according to the classification system outline in "The Yeasts, a Taxonomic Study" by J. Lodder and W. J. W. Kreger-Van Rij, published by North Holland publishing Co. (Amsterdam) (1952).

Preferably when a yeast is employed this is of the family Cryptococcaceae and particularly of the sub-family Cryptococcoideae however, if desired there may be used, for example, ascosporogeneous yeasts of the sub-family Saccharomycoideae. Preferred genera of the Cryptococoideae sub-family are Torulopsis (also known as Torula) and Candida. Preferred species of yeast are as follows. In particular it is preferred to use the specific stock of indicated Baarn reference number; these reference numbers refer to CBS stock held by the Centraal Bureau vor Schimmelculture, Baarn, Holland and to INRA stock held by the Institut National de la Recherche Agronomique, Paris, France.

| | |
|---|---|
| Candida lipolytica | CBS 610 |
| Candida pulcherrima | |
| Candida utilis | |
| Candida utilis, Variati major | CBS 841 |
| Canadida tropicalis | CBS 2317 |
| Torulposis colliculosa | CBS 133 |
| Hansenula anomala | CBS 110 |
| Oidium lactis | |
| Neurospora sitophila | |
| Mycoderma cancoillote | INRA: STV 11 | of the above, *Candida lipolytica* is particularly preferred.

If desired the micro-organism may be a mould. Suitable moulds are Penicillium and preferably there is used *Penicillium expansum*. Another suitable genus is Aspergillus.

If desired the micro-organism may be a bacterium.

Suitably the bacteria are of one of the orders: Pseudomonadales, Eubacteriales and Actinomycetales.

Preferably the bacteria which are employed are of the families Corynebacteriaceae, Micrococcaceae, Achromobacteraceae, Actincymycetaoeae, Rhizobiaceae, Bacillaceae and Pseudomonadaceae. Preferred species are *Bacillus megaterium*, *Bacillus subtilis* and *Pseudomonas aeruginosa*. Other species which may be employed include:

*Bacillus amylobacter*
*Pseudomonas natriegens*
Arthrobacter sp.
Micrococcus sp.
Corynebacterium sp.
*Pseudomonas syringae*
*Xanthomanas begoniae*
*Flavobacterium devorans*
Acetobacter sp.
Actinomyces sp.
*Nocardia opaca*

It will usually be possible to separate the micro-organism, contaminated with some unmetabolised feedstock and aqueous nutrient medium, from the bulk of the unmetabolised feedstock fraction. Preferably the separation is achieved by means of a decantation; additionally or alternatively centrifuging may be used.

The preferred hydrocarbons in which the micro-organism is grown are the hydrocarbon gas oil fractions obtained from crude petroleum and normal alkanes.

It is thought that the fatty acids present in the lipid extracts play a major part in the antifoam activity of these extracts. Hydrolysis of the lipid extracts liberates fatty acids bound up in compounds in the lipid extracts, for example in triglycerides and in phospholpids.

The lipid extracts can be treated to various purification stages to improve their effectiveness, and the fatty acids can be separated from the rest of the lipid extract using the methods described in U.K. patent application 41,539/68. These fatty acids are also very effective antifoam additives.

It has very surprisingly been found that the hydrolysed lipid extracts, and the fatty acid mixture obtained from them, are better antifoam additives than fatty acids obtained from other sources and than individual fatty acids. This increased effectiveness is very unexpected.

Preferably the mineral base oil is a naphthenic oil of viscosity between 10–30 cs. at 140° F. contains from, 0.1 to 25% by weight of the hydrolysed lipid extracts of materials isolated from the lipid extracts. The antifoam oil can be applied to the surface of the water using conventional dispersion where it is desired to suppress foam.

Examples of materials used in preparing blends according to the invention are given below.

EXAMPLE 1

A yeast of the species *Candida tropicalis* was grown in a gas oil of boiling range 300° C. to 400° C. in the presence of a nutrient medium containing nitrogen and phosphorus. During the growing period air was blown through the liquid mixture, as in U.K. Pat. 1,017,584.

When the growth had reached the desired stage as measured by the cellular density of the yeast the mixture was centrifuged. A pasty phase containing yeast cells impregnated with hydrocarbons and aqueous medium was thus separated. This pasty phase was washed with water to remove the bulk of the gas oil, and the product obtained heated to 80–90° C. in a rapid current of air and ground to a powder.

The powder was treated by solvent extraction using a mixture of isopropanol, n-hexane and water. The solids not removed by the extracting liquids are the purified food-yeasts and the extracting liquids contain the yeast lipids extract. The extracting liquids are subjected to distillation and all the solvent removed, prior to settling, to give a total yeast lipid extract, TL.9.

EXAMPLE 2

TL.9 (100 g.) and 2 N hydrochloric acid (400 ml.) were heated under reflux for 6 hours under an atmosphere of nitrogen. Water and hydrochloric acid were removed by heating at 80° C./15 mm. Hg to leave a residue of hydrolysed lipids, TL.9.13 (93 g.).

EXAMPLE 3

Lipid extract TL.9 (258 g.) was dissolved in n-heptane (2000 ml.) and the solution filtered to yield TL9.31 (232 g.) freed from residual yeast and mineral salts. TL9.31 (100 g.) was heated under reflux with 4 N hydrochloric acid (200 ml.) and methanol (200 ml.) for 24 hours under nitrogen. Methanol and dilute hydrochloric acid were removed by distillation at 90°/15 mm. Hg and the residual material was vacuum-distilled and two fractions, the first (14.4 g.) boiling over the range 86°–160° C./0.15 mm. Hg and the second (47.3 g.) boiling over the range 160°–168° C./015 mm. Hg were collected. Part (18 g.) of the second fraction was heated under reflux with ethanolic potassium hydroxide (16 g. KOH/200 ml. ethanol) for 45 minutes. The quantity of potassium hydroxide used represents an excess of about 3 mols (mol ratio KOH: ester=4:1). Ethanol was removed by distillation 75° C./15 mm. Hg) and water (20 ml.) added to decompose residual potassium ethoxide. The water was distilled off (75° C./15 mm. Hg) to leave a solid residue comprising a mixture of potassium hydroxide, gas oil and the potassium salts of the fatty acids. The gas oil was removed by cold extraction with n-heptane and the remaining solids were dissolved in water and acidified with 2 N hydrochloric acid to precipitate the fatty acids which were recovered by extraction with n-heptane. A yield 11.5 g. purified fatty acids, neutralization number=196 mg. KOH/g. TL.9.32B. This represents a yield of approximately 30 g. acids/100 g. crude lipids.

The materials obtained as in Examples 2 and 3 were tested as antifoam additives in a naphthenic spindle oil basestock using the apparatus illustrated in the drawing. This apparatus comprises a constant head device 1, a detergent dispenser 2 incorporating screw clip 7, an aspirator 3, a glass trough 4, a dispersator 5, a broken siphon 6 and a test oil dispenser 8.

A flow of water is maintained through the system at a constant rate (1400 ml./minute) by means of the constant head device 1. Water passes from the constant head device into an aspirator 3, where it is mixed with detergent. The drop rate of the detergent is adjusted by means of a screw-clip 7 to give the desired detergent concentration an dthe solution is mixed in the aspirator 3 by the incoming flow of water. Thence the detergent solution passes into a glasstrough 4, where it is aerated with a dispersator 5 rotating at a constant speed. The level in the trough is kept constant using a broken siphon tube 6 as shown in the diagram. Antifoam oil is allowed to drip, from a capillary tube 8 onto the surface of the detergent solution in the trough.

With no oil on the surface of detergent solution the dispersator was switched on, the foam allowed to build up to a height of 5 cm., when a drop of oil was allowed to fall on the surface of the solution. Further oil drops, were added at constant intervals of time and the foam heights (maximum) were measured just before each drop fell. The test was continued for at least an hour and the average of the maximum foam heights was calculated. The results are shown in the following tables.

Table 1 compares the performance of blends made using the additives of the present invention with that of blends made using other typically commercially available organic acid materials compounds and Table 2 compares the performance of a blend of an additive of the present invention with a commercially avialable antifoam oil when tested using detergent solution containing an acid or alkali to simulate conditions which may be met in practice.

TLA.32B was made as in Example 3, and TL9.13 was made as in Example 2. TL9.13 was used at a relatively high concentration because of its comparatively low acid content. The naphthenic spindle oil base stock used to make the blends had the following characteristics: Viscosity at 100° F.=22.9 cs., viscosity at 210° F.=3.6 cs. Specific gravity 0.924.

The detergent used was a commercially available blend of alkyl benzene sulphonates and alkyl sulphates sold by The British Petroleum Company under the trade name "Byprox."

A typical composition of FA 1 tall oil fatty acids is as follows:

| | Percent |
|---|---|
| Oleic acid | 45 |
| Linoleic acid | 41 |
| Linolenic acid | 3 |
| Stearic acid | 3 |
| Palmitic acid | 5 |
| Other acids | 2 |

TABLE 1

| Antifoam oil additive component | Average maximum foam height (cm.) at oil addition rate of: | | | Detergent concentration, p.p.m. |
|---|---|---|---|---|
| | 1 drop/ 8 mins. | 1 drop/ 10 mins. | 1 drop/ 12 mins. | |
| None | | 3.8 | | |
| 5% wt. oleic acid | | 1.9 | | |
| 5% wt. FA1 tall oil fatty acids | | 1.8 | | 10 |
| 5% wt. TL9.32B | 1.4 | 1.7 | 1.5 | |
| 14.3% wt. TL9.13 | 1.3 | 1.7 | 2.2 | |
| None | | 10.9 | | |
| 5% wt. oleic acid | | 4.4 | | |
| 5% wt. FA1 tall oil fatty acids | | 3.7 | | 20 |
| 5% wt. TL9.32B | 1.6 | 1.9 | 3.6 | |
| 14.3% wt. TL9.13 | 1.9 | 2.3 | 5.0 | |
| None | | 17.0 | | |
| 5% wt. oleic acid | | 13.8 | | |
| 5% wt. FA1 tall oil fatty acids | | 16.0 | | 30 |
| 5% wt. TL9.32B | 3.3 | 6.3 | 6.6 | |
| 14.3% wt. TL9.13 | 2.0 | 6.8 | 7.4 | |

TABLE 2

| | Average maximum foam height (cm.) when anti-foam oil is added at a rate of 1 drop/10 mins. to a detergent solution containing 20 p.p.m. Byprox and— | |
|---|---|---|
| | Acetic acid (300 p.p.m.) | Sodium hydroxide (520 p.p.m.) |
| Commercial product* | 5.1, 5.4 | 2.0, 2.3, 1.8 |
| 14.3% wt. TL9.13 | 4.0, 4.0 | 2.3, 2.0, 2.0 |

*Full formulated commercial antifoam oil.

We claim:
1. A composition for inhibiting the formation of foams on liquid surfaces which consists essentially of a mineral base oil and from about 0.1 to 25% by weight of the fatty acid product of the hydrolysis of a lipid extract obtained by the solvent extraction of micro-organism culture grown on a hydrocarbon substrate using as an extracting solvent a solvent system selected from the group consisting of ethanol/diethyl ether, methanol/chloroform, isopropanol/n-hexane and alcohol/water mixtures, said hydrolysis of the lipid extract being carried out using a hydrolysis process selected from acid and basic hydrolysis.

2. A composition as claimed in claim 1 in which the said hydrolysis process uses a hydrolysis agent selected from aqueous solutions of hydrochloric acid, sulphuric acid, sodium hydroxide or potassium hydroxide.

3. A composition as claimed in claim 1 in which the said mineral base oil is a mineral oil having a viscosity of about 10 through 30 centistrokes at 140° F.

4. A method of inhibiting foams on liquid surfaces which consists essentially of adding to the said liquid surface a composition as claimed in claim 1.

5. A composition as claimed in claim 1 wherein the solvent system is an azeotropic isopropanol/water mixture.

References Cited

UNITED STATES PATENTS 2,530,953  11/1950  Fuqua _____ 252—321
2,668,138  2/1954  Walker _____ 252—321

JOHN D. WELSH, Primary Examiner

U.S. Cl. X.R.

252—358; 195—3